United States Patent
Beringer

(10) Patent No.: US 7,014,018 B2
(45) Date of Patent: Mar. 21, 2006

(54) VEHICLE BRAKING DEVICE

(75) Inventor: Gilbert Beringer, Chatelneuf (FR)

(73) Assignee: S.A. Beringer, Chatelneuf (FR)

( * ) Notice: Subject to any disclaimer, the term of this patent is extended or adjusted under 35 U.S.C. 154(b) by 0 days.

(21) Appl. No.: 10/865,004

(22) Filed: Jun. 10, 2004

(65) Prior Publication Data
US 2004/0222050 A1    Nov. 11, 2004

Related U.S. Application Data

(63) Continuation of application No. PCT/FR02/04189, filed on Dec. 5, 2002.

(30) Foreign Application Priority Data
Dec. 10, 2001 (FR) .................... 01 16074

(51) Int. Cl.
*F16D 65/14* (2006.01)
(52) U.S. Cl. ................ 188/73.45; 188/71.1; 188/73.39
(58) Field of Classification Search ............. 188/70 R, 188/71.1, 71.3, 71.4, 71.5, 72.4, 72.5, 72.6, 188/73.1, 73.2, 73.31, 73.33, 73.35, 73.36, 188/73.37, 73.39, 73.45, 73.47
See application file for complete search history.

(56) References Cited

U.S. PATENT DOCUMENTS

| | | | | |
|---|---|---|---|---|
| 3,841,446 A | * | 10/1974 | Gravel, Jr. ............... | 188/73.35 |
| 4,093,043 A | * | 6/1978 | Smith ....................... | 188/73.46 |
| 4,351,420 A | * | 9/1982 | Burgdorf .................. | 188/73.45 |
| 4,401,194 A | | 8/1983 | Klassen .................... | 188/73.44 |
| 4,823,920 A | * | 4/1989 | Evans ....................... | 188/73.34 |
| 5,002,160 A | * | 3/1991 | Weiler et al. .............. | 188/71.6 |
| 5,819,886 A | * | 10/1998 | Null ......................... | 188/73.41 |
| 2003/0070887 A1 | | 4/2003 | Beringer | |
| 2004/0154885 A1 | * | 8/2004 | Gotti et al. ............. | 188/250 B |

FOREIGN PATENT DOCUMENTS

| | | |
|---|---|---|
| DE | 2 211 013 | 9/1973 |
| DE | 28 49 952 | 5/1980 |
| FR | 2 8907 129 | 10/2001 |
| JP | 8121507 | * 5/1996 |

* cited by examiner

*Primary Examiner*—Devon C. Kramer
(74) *Attorney, Agent, or Firm*—Heslin Rothenberg Farley & Mesiti P.C.

(57) ABSTRACT

A braking device includes a caliper housing having two parallel flanges assembled at each end by a transverse guard so as to define a median opening for positioning pads. The pads have, at each of their upper end, fittings to be supported and guided by shafts acting as slides. The shafts are, over their entire length, engaged in the thickness of the flanges and partly in the thickness of the guards corresponding to a zone where there is no significant deformation. Hysteresis resulting from friction between the pads and the housing is thereby reduced.

6 Claims, 6 Drawing Sheets

VEHICLE BRAKING DEVICE

Continuation of prior application No.: PCT/FR02/04189 filed Dec. 5, 2002.

The invention relates to the technical field of braking devices for all types of vehicle, particularly motor cars and motorcycles.

In general terms, this type of device provides, for each wheel of the vehicle in question, a brake caliper comprising, in a way well known to those skilled in the art, pistons fitted in a housing. The housing has fittings for mounting, in two parallel planes, two pads which are controlled by the pistons to act on at least one disk present on the wheel of the vehicle. The pistons are connected hydraulically to a master cylinder, so that they can be controlled by one or more actuator members which can be operated by hand, in the case of a motorcycle, or by the foot, in the case of an automobile.

The invention relates to a brake caliper comprising at least two opposing pistons.

The pressure applied to the brake caliper by the master cylinder determines the braking action, in other words the deceleration of the vehicle, which may or may not be followed by the total stopping of the vehicle.

In a conventional caliper with opposing pistons, the tangential force of the pads is received by the caliper housing. Under the effect of the pressure exerted, the housing and caliper tend to open, to a more than negligible degree, thus creating friction between the pad and the housing, and counteracting the normal force of the pistons an a result.

This deformation is due to the assembly of the pads with respect to the caliper, which is not carried out in a way which allows for the hysteresis due to the friction between the pad and the housing caused by the pressure exerted by the pistons. The driver is therefore unable to test the deceleration accurately, or to significantly decrease the tangential force, unless he considerably reduces the pressure in order to decrease the forces. It therefore becomes difficult to judge and correctly set the braking.

An advantageous solution to these problems is described in Patent Application FR 00.04531, filed by the present applicant. This patent discloses pad mounting fittings which consist of means for receiving the tangential force of said pads, in such a way that any movement of the pads is prevented during braking. These arrangements enable the direct or indirect friction between the housing and the pads to be eliminated to a very considerable extent.

Starting from this prior art, the problem which the invention is intended to resolve is that of improving the assembly of the pads, in the case of a brake caliper with opposing pistons, the objective being in all cases to decrease the friction, and consequently the hysteresis, to a very considerable extent, but also to prevent any occurrence of bending and shearing in the fittings for mounting the pads on the caliper, particularly in the case of an application to automobiles.

Another aim was to be able to apply the invention in the case of a braking system using at least two parallel disks mounted between the brake pads.

To resolve this problem, a braking device has been designed and perfected, this device being of the type comprising a caliper fitted with at least two opposing pistons mounted in a housing having fittings for mounting, in a parallel plane, at least two brake pads controlled by said pistons to act on at least one disk.

According to the invention, taking into account the problem which was posed:

the caliper housing consists of two parallel sides, joined at each end by a transverse link in order to delimit a median opening for the positioning of the pads;

the pads have, at each of their upper ends, fittings to be supported and guided by shafts acting as slides;

the shafts are engaged, over their whole length, in the thickness of the sides, and are partially engaged in the thickness of the links, in an area where there is no deformation, in order to reduce significantly the hysteresis due to the friction between the pads and the housing.

Advantageously, approximately half of the circumference of each shaft is incorporated.

To resolve the problem which was posed of facilitating the positioning of the brake pads, the fittings of the pads consist of semicircular cut-outs formed from the transverse edge of a supporting element receiving the friction element forming the actual brake lining.

On the basis of this fundamental design, the braking device as defined and claimed can be applied in a particularly advantageous way to the mounting of two parallel disks, each mounted between two brake pads.

To resolve this problem, each side has, very approximately in its median part, a boss for the mounting, in pairs, of a transverse shaft for receiving a supporting element whose ends interact with and bear on the shafts forming slides, said supporting element receiving, on both sides, a friction element, in order to delimit, in combination with the lateral pads, two spaces for the engagement of two parallel disks, the pistons being mounted in opposition to act simultaneously on the lateral pads with respect to the supporting element which is fixed with respect to translation on the transverse shaft.

The braking device with two parallel disks, each being mounted between two brake pads, can be applied to a vehicle of the motorcycle type or of the automobile type.

To resolve the previously posed problem of allowing for the wear of the pads, the two disks are integral with a ring on the hub of the wheel in question, in combination with complementary fittings to allow said disks to be moved with respect to said ring, said fittings being controlled by means for creating a frictional force to move the disks as the pads become worn.

Advantageously, the means for creating a frictional force consist of at least one elastic member of the spring type, shaped to press the ring fittings against the disk fittings.

In view of the arrangements for mounting the two disks, it will be evident that the orientation of each disk is defined by the two corresponding pads, thus ensuring that each of the disks is constantly guided.

The invention is described more fully below with the aid of the figures on the attached drawings, in which.

Figure 1:
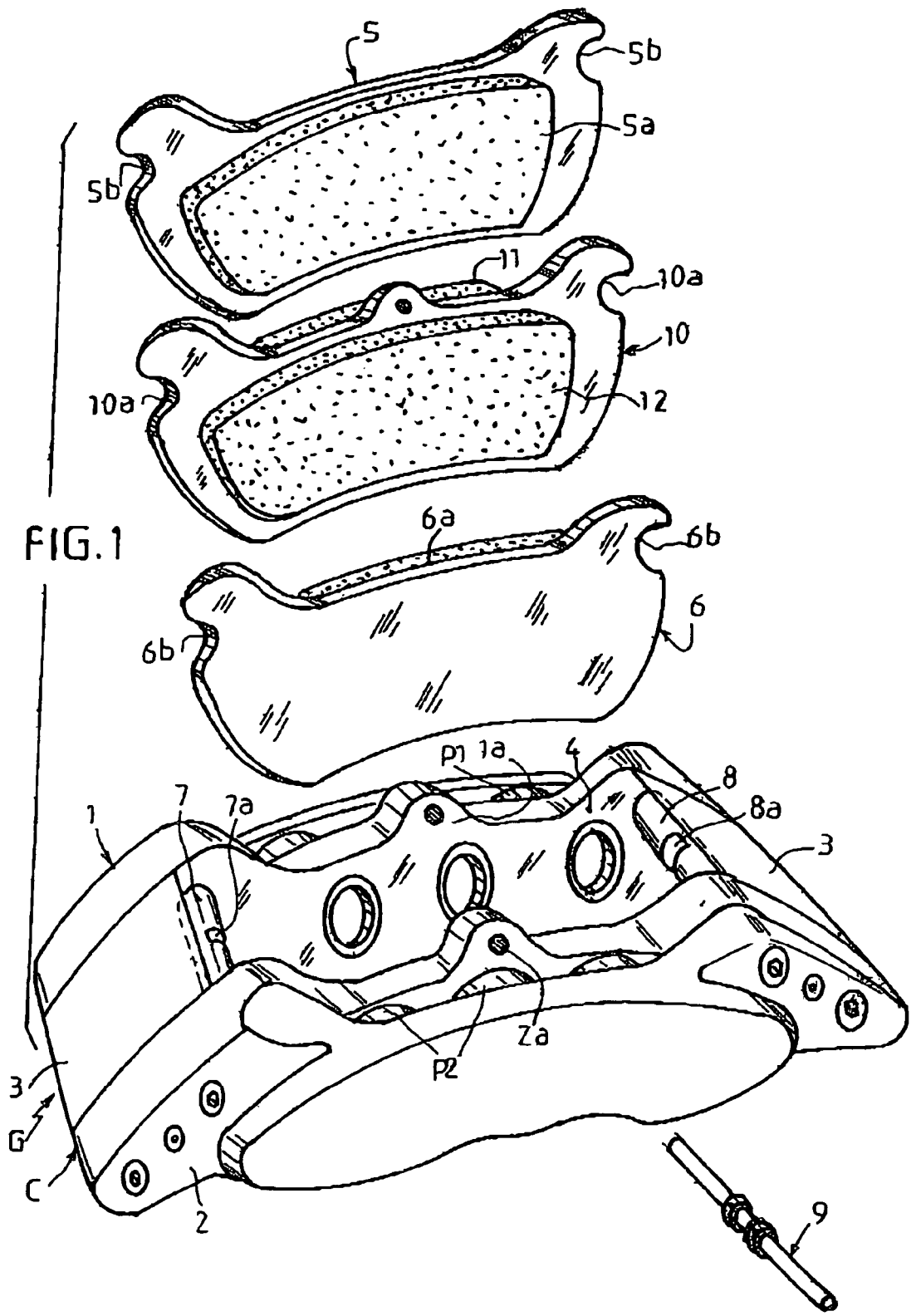
FIG. 1 is a perspective view of a preferred embodiment of the caliper, before the positioning of the pads, in the case of a braking device using two disks.
Figure 3:
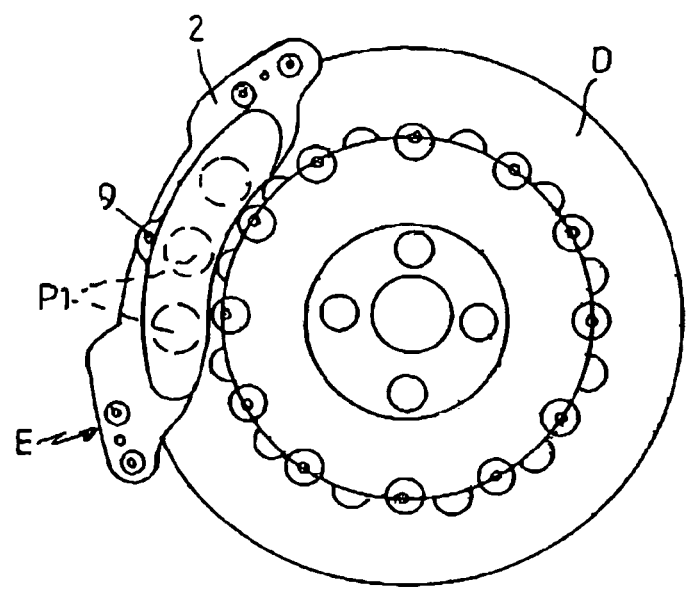
FIG. 3 is a schematic front view of the caliper with a brake disk.
Figure 2:
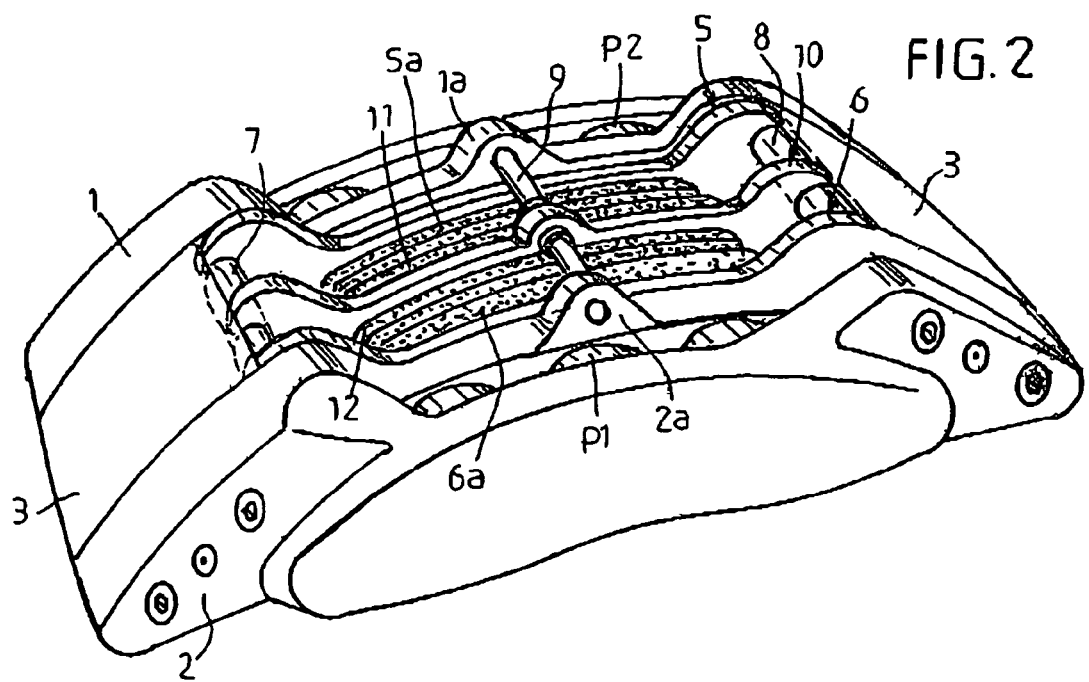
FIG. 2 is a perspective view after the positioning of the pads according to FIG. 1.
Figure 4:
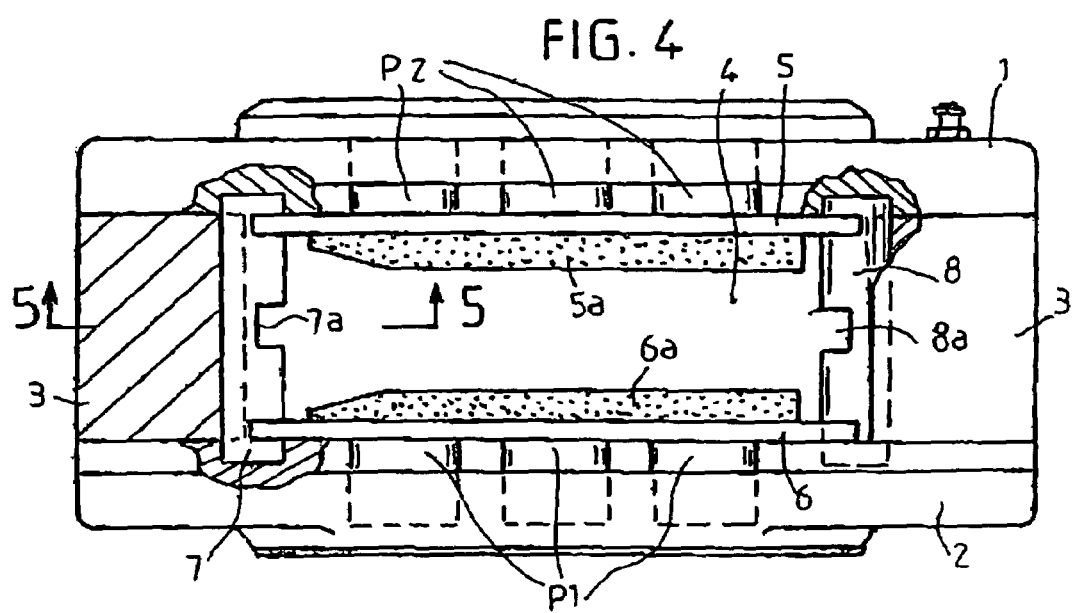
FIG. 4 is a plan view, in partial section, of a brake caliper in the case of a single disk.
Figure 5:
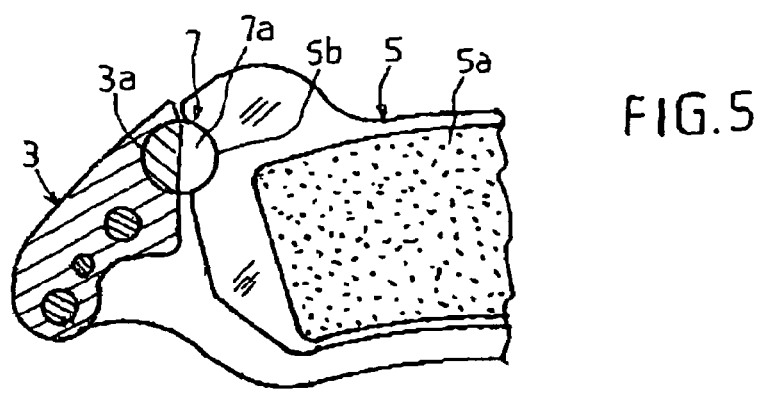
FIG. 5 is a cross-sectional view taken along the line 5—5 in FIG. 4.
Figure 6:
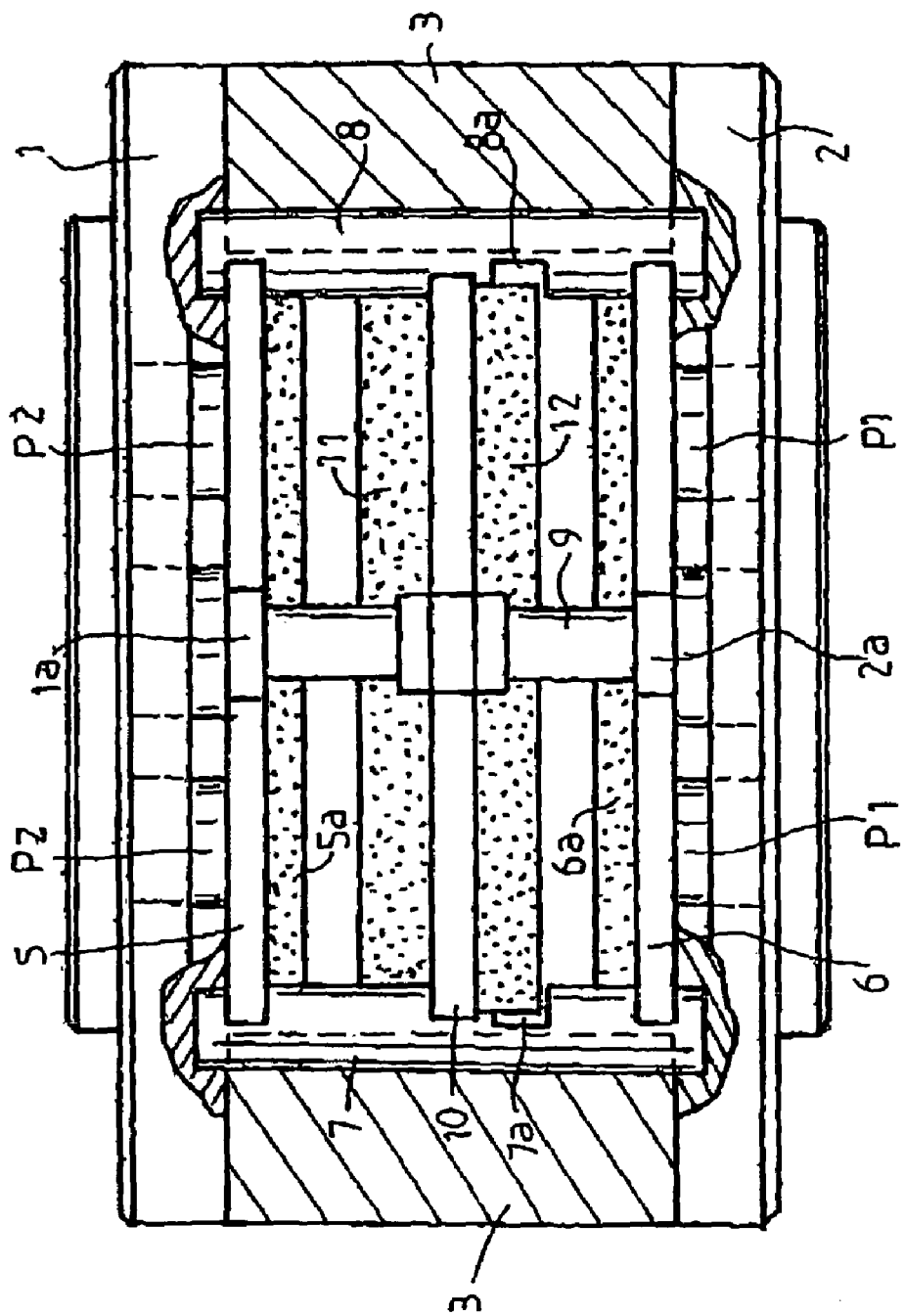
FIG. 6 is a plan view, in partial section, of a caliper in the case of a double disk.

In a known way, the braking device comprises a caliper, indicated as a whole by (E), provided with at least two substantially opposing pistons (P1) and (P2), mounted in a housing (C) having fittings for the mounting, in two parallel planes, of at least two brake pads controlled by the pistons (P1) and (P2) to act on at least one disk (D). In the remainder of the description, the term "brake pad" denotes the assembly comprising, in a known way, a supporting element on which is fixed, particularly by gluing or otherwise, a friction or brake lining. These brake linings are positioned on both sides of each face of the disk, and face each other.

In the example of embodiment shown in the figures of the drawings, the caliper housing (C) consists of two parallel sides (1) and (2) joined, at each end, by a shaped transverse link (3). Each of the two links (3) delimits, in combination with the sides (1) and (2), a central and median opening (4) for the positioning of the brake pads (5) and (6), and for the passage of the disk (D) between the linings (5a) and (6a) of said pads. The links (3) are shaped to form sectors of circles, in such a way as to approximately match the outer periphery of the disk.

Each of the sides (1) and (2) has fittings in the form of recesses, particularly for mounting the opposing pistons (P1) and (P2) in a sealed way.

For example, each of the sides (1) and (2) has three pistons.

According to an important characteristic of the invention, the brake pads (5) and (6) have fittings at each of their upper ends, to be supported and guided by shafts (7) and (8) acting as slides, which are partially integrated over the whole of their length in the thickness of the housing and in the areas where there is no deformation. These arrangements make it possible to reduce significantly the hysteresis due to the friction between the pads and the housing.

As shown in the figures of the drawings, the shafts (7) and (8) are engaged in holes or recesses formed in the thickness of the sides (1) and (2), and in a semicircular rectilinear indentation (3a) formed in the thickness of each of the links (3). These assembly arrangements prevent any bending of the shafts (7) and (8) which bear fully, over the whole of their length, on the corresponding fittings of the caliper.

It will be noted that approximately half of the circumference of each shaft (7) and (8) is incorporated in the corresponding indentation (3a) of the link (3), in such a way that sufficient support is left on the transverse edges of the central opening (4) for the brake pads (5) and (6). For this purpose, each of the pads (5) and (6) has, in its supporting part, semicircular cut-outs (5b) and (6b) formed from the transverse edge of the supporting element receiving the friction or braking element (5a) and (6a).

Each shaft (7) and (8) has a notch (7a) and (8a) for the positioning of the pads (5) and (6). Accordingly, it is simply necessary to introduce each of the pads, whose transverse edges are inclined, vertically into the notches (7a) and (8a) of the correspondingly positioned shafts (7) and (8), until the cut-outs (5b) and (6b) of the pads (5) and (6) come to bear on the projecting bearing surfaces of the shafts (7) and (8), and then to slide each of the pads towards each of the sides (1) and (2), in order to subject them to the action of the corresponding piston.

On the basis of this fundamental design of the caliper and the specific mounting of the pads in combination with the shafts (7) and (8), the design of the caliper can be used advantageously in the case of a braking system using two parallel and independent disks (D1) and (D2).

The fundamental design of the caliper housing with the shafts (7) and (8) remains the same If necessary, the links (3) can simply be made wider in order to allow for the increase in the overall dimensions due to the presence of the two parallel disks (D1) and (D2).

The sides (1) and (2) have, very approximately in their median parts, bosses (1a) (2a) for mounting a transverse shaft (9) in pairs. This shaft (9) has fittings, very approximately in its median part, for mounting a supporting element (10) which receives a friction element (11) and (12) on each side, in order to form, indirectly, two fixed central brake pads. The friction elements (11) and (12) delimit, in combination with the friction elements (5a) and (6a) of the lateral pads (5) and (6), two spaces for the engagement of the two parallel disks (D1) and (D2).

In the same way as the pads (5) and (6), the supporting element (10) receiving the two pads (11) and (12) has, at each of its ends, semicircular cut-outs (10a) formed from the corresponding transverse edge. These cut-outs interact with and bear on the projecting bearing surfaces of the shafts (7) and (8).

Because of this fundamental design of the caliper and the use of two parallel disks (D1) and (D2), the overall width becomes greater, so that it is preferable to distinguish the application to a vehicle of the motorcycle type from the application to a vehicle of the automobile type.

In the case of a vehicle of the motorcycle type, each of the sides (1) and (2) has one piston, but generally a plurality of pistons (P1) and (P2), The pistons (P1) and (P2) are mounted in opposition to act simultaneously on the lateral pads (5) and (6) with respect to the supporting element (10) which is fixed with respect to translation on the transverse shaft (9). Reference may be made, for example, to FIGS. 7 and 8.

In the case of an application to an automobile, only one of the sides, namely the side (1) located on the inner side of the hub carrying the wheel, has one piston, but generally a plurality of pistons, to act on the corresponding lateral pad (5). In this case, the supporting element (10) receiving the two pads (11) and (12) is mounted with the capacity to move by translation along the transverse shaft (9). The side (2), located on the outer side, therefore has a smaller overall width than the side (1), since said side (2) has no piston (FIG. 8A).

The two disks (D1) and (D2) are mounted with provision for limited movement on fittings positioned peripherally on a hub or ring (15) fixed to the wheel of the vehicle in questions For this purpose, the disks (D1) and (D2) and the ring (15) have complementary fittings controlled by means for creating a prestress in the form of a frictional force to move the disks as the pads (5) (11) and (6) (12) become worn.

Figure 7:
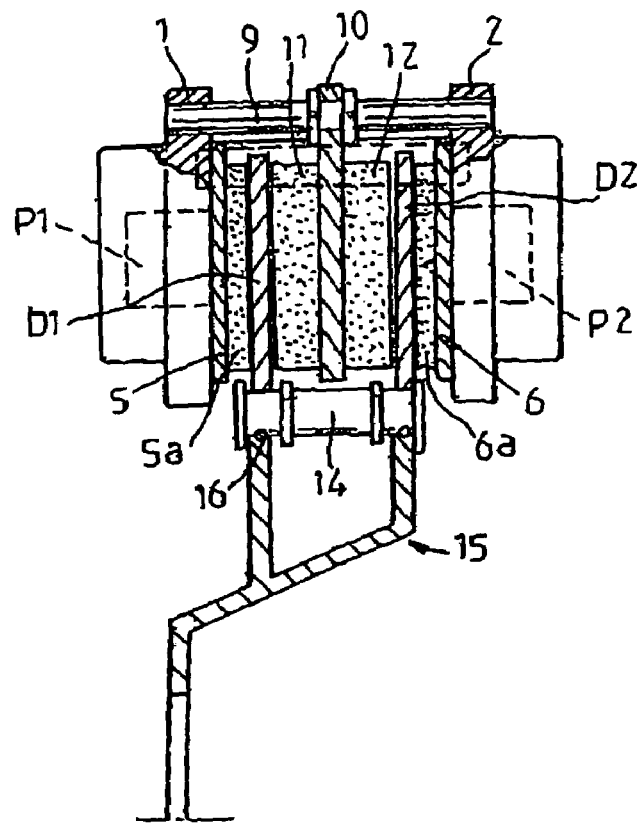
FIG. 7 is a cross-sectional view taken along the line 7—7 in FIG. 6.

In an embodiment shown in FIG. 7, the fittings consist of bushes (14) fixed, preferably at regular intervals, to the periphery of the ring (15) so that they can engage in semicircular cut-outs present in the inner circular edge of the disks made in the form of rings The disks (D1) and (12) and the bushes (14) are controlled by at least one elastic member of the spring type (16) shaped to press the bushes (14) against the semicircular cut-outs of the disks. These bushes can be controlled by an independent elastic member. The resulting frictional force therefore opposes the movement of the disk.

Figure 8A:
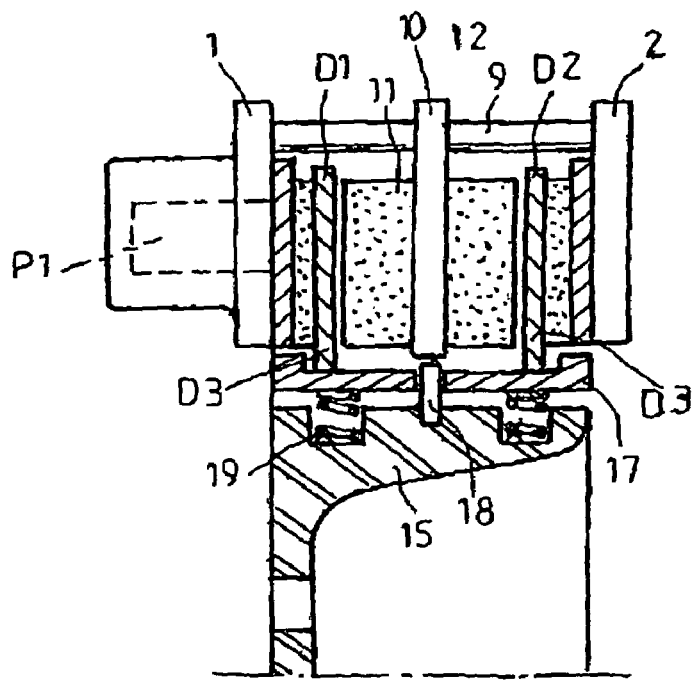
FIG. 8A is a view similar to that of FIG. 9 in the case of an application to a vehicle of the automobile type.
Figure 9:
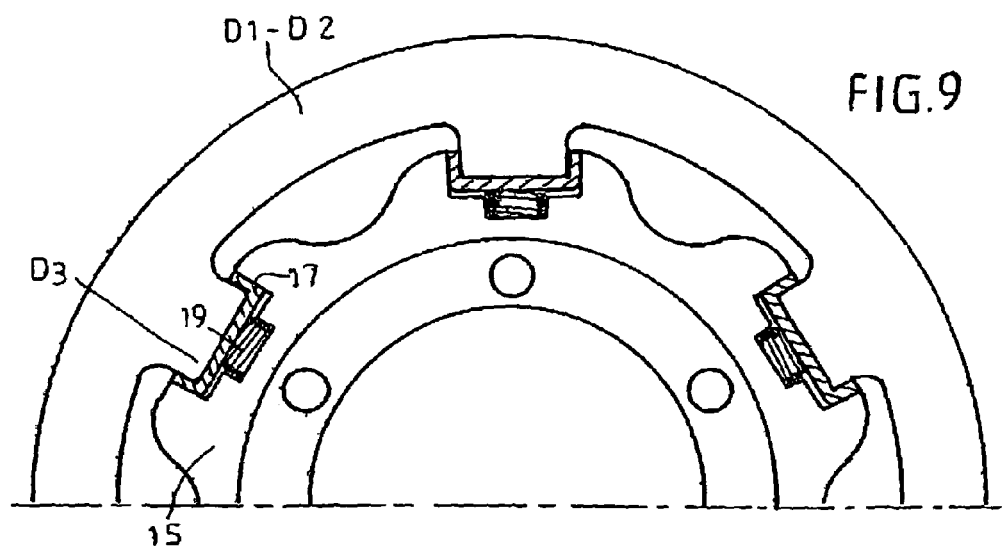
FIG. 9 is a partial front view, corresponding to FIG. 8, in Which the caliper is not shown.
Figure 8:
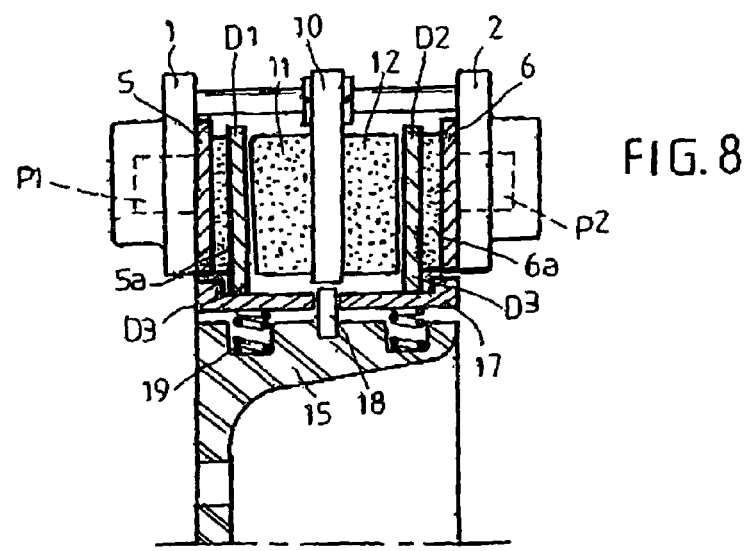
FIG. 8 is a cross-sectional view, similar to that of FIG. 7, of another embodiment for the frictional movement of the disks and in the case of an application to a vehicle of the motorcycle type.

In another embodiment which is shown in FIGS. 8, 8A and 9 of the drawings, and which can be advantageously applied in the case of an automobile, each of the two disks (D1) and (D2) consists of a ring whose inner circular edge has bosses (D3) distributed regularly over the circumference, each of these bosses being engaged and guided in a caliper (17) having a U-shaped cross section. This caliper (17) is mounted in a complementary housing formed from the outer edge of the ring (15) of the hub. This caliper is fixed with respect to translation by means of a pin (18) and is controlled by springs (19) to provide a prestress, as in the preceding embodiment, and to create a frictional force to prevent the axial movement of the disks as the pads become worn. The action of the springs (19) presses the calipers against the bosses (D3) of the disks. It will also be noted that these calipers protect the ring or the hub from any dulling effect of the disks due to the braking force.

A mentioned previously, in the case of an application to an automobile, owing to the reduced space between the hub and the inside of the wheel, the braking device is advantageously of the type shown in FIG. 8A.

The advantages are made clear by the description.

The invention claimed is:

1. A vehicle braking device comprising a caliper provided with at least two opposing pistons mounted in a housing having fittings for mounting, in parallel planes, at least two brake pads controlled by said pistons to act on at least one disk, wherein:

the caliper housing comprises two parallel sides, joined at each end by a respective transverse link in order to delimit a median opening for positioning of the pads;

the pads have, at each of their upper ends, semicircular cut-outs formed from a transverse edge of a supporting element receiving a friction element supported and guided by shafts acting as slides;

the shafts are engaged, over their whole length, in the thickness of the sides, and in approximately semicircular rectilinear indentations formed in the thickness of the respective transverse link, in an area where there is no deformation, in order to reduce significantly hysteresis due to friction between the pads and the housing; and wherein the sides have, approximately in their median parts, bosses for mounting, in pairs, of a transverse shaft for receiving a supporting element whose ends interact with and bear on the shafts acting as slides, said supporting element receiving, on both sides, a friction element, in order to delimit, in combination with the pads, two spaces for engagement of two parallel disks, the pistons being mounted in opposition and acting simultaneously on the pads with respect to the supporting element which is fixed with respect to translation on the transverse shaft.

2. The device as claimed in claim 1, wherein each shaft has a notch therein parallel to said sides for positioning of the pads.

3. The device as claimed in claim 1, wherein the two disks are mounted on a ring or hub, with provision for movement, in combination with complementary fittings controlled by means for creating a frictional force to move the disks as the pads become worn.

4. The device as claimed in claim 3, wherein the means for creating a frictional force comprises at least one elastic member, shaped to apply pressure to the complementary fittings.

5. The device as claimed in claim 3, wherein the fittings comprise bushes positioned peripherally, at regular intervals, on the ring or hub and engaged in cradles of complementary shape located peripherally on the fittings of each of the disks.

6. The device as claimed in claim 3, wherein the fittings comprise calipers having a U-shaped cross section, mounted in fittings of complementary shape formed on a periphery of the ring or hub, each of said calipers being controlled by at least one elastic member so that it is pressed against bosses which are present on each of the disks and which are engaged in said calipers.

* * * * *